Aug. 15, 1967  G. W. JACKSON  3,336,070
TAILGATE TORSION BAR
Filed Jan. 7, 1965  2 Sheets-Sheet 1
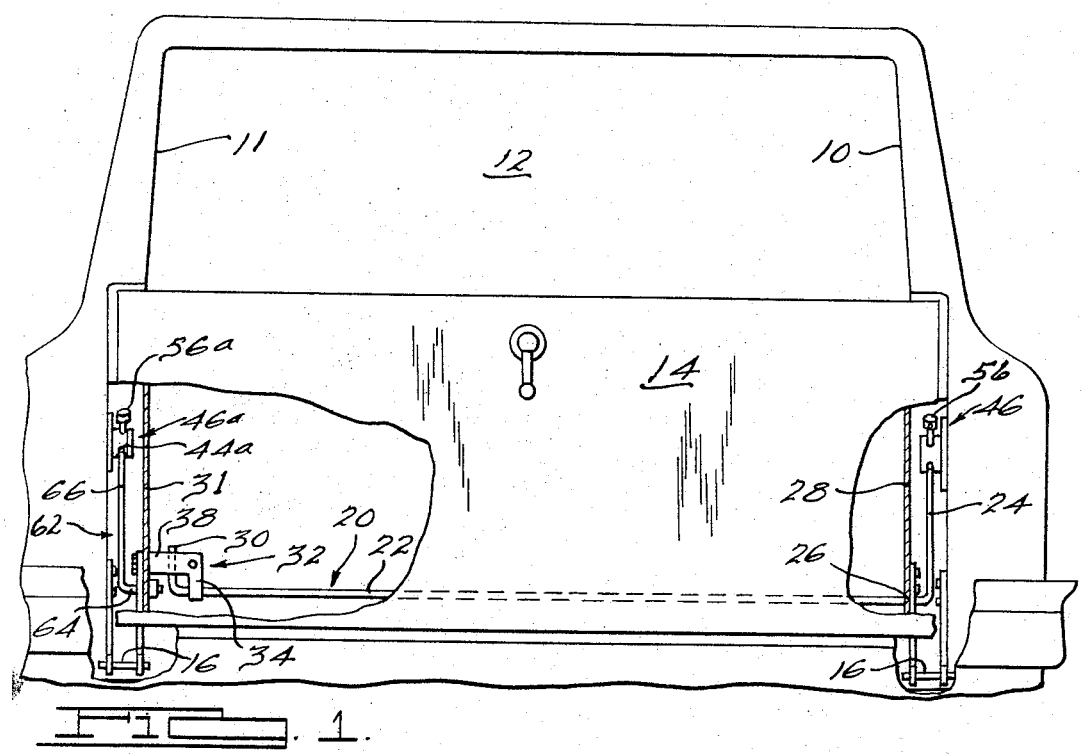
FIG. 1.
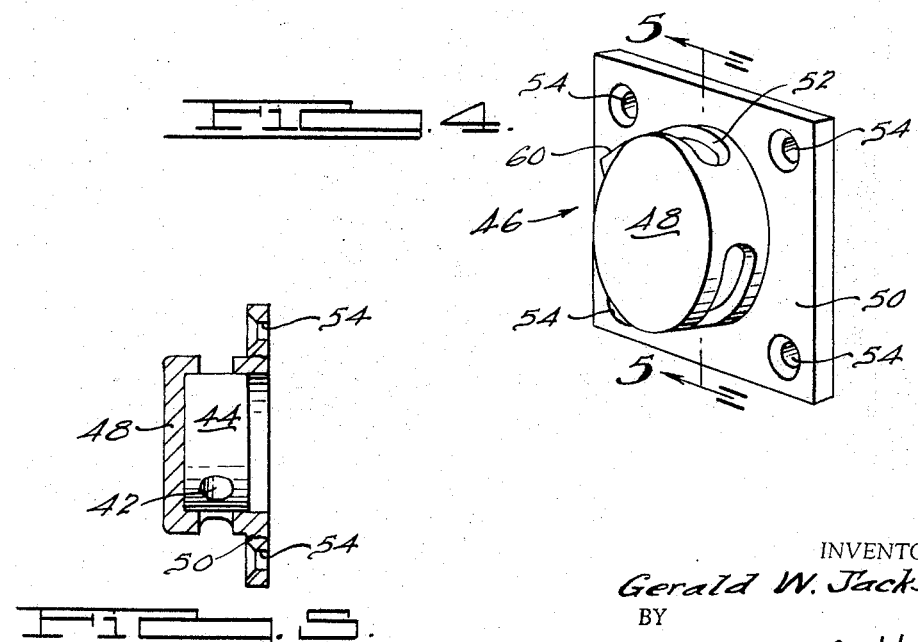
FIG. 4.
FIG. 5.
INVENTOR.
Gerald W. Jackson
BY
Harness and Harris
ATTORNEYS.

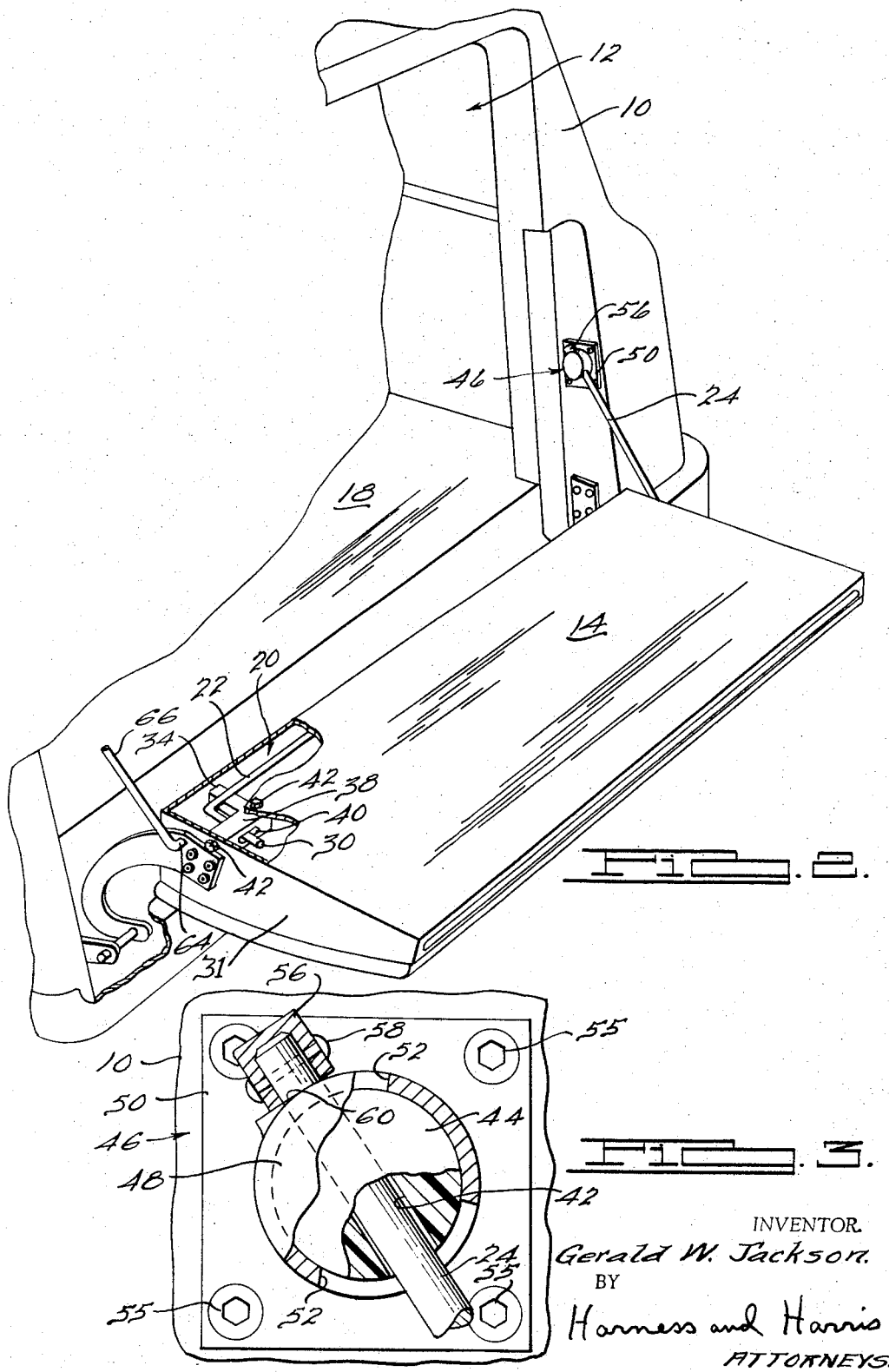

United States Patent Office 3,336,070
Patented Aug. 15, 1967

3,336,070
TAILGATE TORSION BAR
Gerald W. Jackson, 21500 Nowlin,
Dearborn, Mich. 48124
Filed Jan. 7, 1965, Ser. No. 424,053
8 Claims. (Cl. 296—57)

This invention relates to a torsion bar mechanism for a closure member of a motor vehicle. More particularly, it relates to a torsion bar mechanism for a tailgate.

It is an object of the present invention to provide an improved torsion bar mechanism for a closure member of a motor vehicle.

It is a more specific object to provide an improved torsion bar mechanism for a tailgate wherein the torsion bar itself will also serve as a tension strut supporting the tailgate in its open or down position, thereby eliminating a separate support mechanism.

Yet another object is to provide, in a tailgate torsion bar mechanism of the type wherein the torsion bar itself also serves as a tension strut supporting the tailgate in its down position, a simplified construction allowing more economical manufacture.

Another object is to provide, in a tailgate torsion bar mechanism of the aforesaid type, an improved construction offering smoother, more positive performance.

Another object is to provide in a tailgate torsion bar mechanism of the aforesaid type, an improved construction maintaining the structural integrity of the pillar structure adjacent the tailgate opening.

These and other objects, features and advantages of the invention will be apparent from the following detailed description of a preferred embodiment of the invention and from the accompanying drawings wherein:

FIGURE 1 is a rear view of an automobile of the suburban type employing a tailgate torsion bar mechanism embodying features and the present invention, the outer skin of the tailgate being selectively broken away to reveal structural details of the torsion bar mechanism;

FIGURE 2 is a fragmentary perspective view of the automobile of FIGURE 1 showing the tailgate in its down or open position, a portion of the inner skin of the tailgate being broken away to reveal further constructional details of the torsion bar mechanism;

FIGURE 3 is a fragmentary view on an enlarged scale showing details of the construction of the tailgate torsion bar mechanism adjacent the pillar of the automobile;

FIGURE 4 is a perspective view showing further details of the construction adjacent the automobile pillar; and FIGURE 5 is a cross sectional view taken on line 5—5 of FIGURE 4.

Referring first to FIGURES 1 and 2, the automobile shown therein is of the suburban or station wagon type and includes the usual body pillars 10 and 11, defining therebetween a cargo opening 12, and a tailgate 14.

Tailgate 14 is hinged at pins 16 for pivotal movement between the substantially upright closed position of FIGURE 1, in which it closes the lower portion of opening 12, and the substantially horizontal open position of FIGURE 2, in which it extends rearwardly to provide an extension of the cargo floor 18 of the vehicle.

A torsion bar, seen generally at 20, counterbalances the tailgate during movement between its open and closed positions and also, according to the invention, provides a tension strut supporting the tailgate in its down or open position.

Torsion bar 20 is of generally L shape and includes a main body or torsion leg 22 and a crank leg 24.

Torsion leg 22 is rotatably journaled at 26 in endwall 28 of tailgate 14 and extends therefrom transversely across tailgate 14 toward opposite endwall 31. The free end of leg 22 is cranked to provide a stub arm 30 which is trapped by a block member 32 to hold the free end of leg 22 against rotation relative to the tailgate. Member 32 is of generally L shape and includes a hook portion 34, coacting with the inner skin 36 of the tailgate to trap leg 22 therebetween, and a main body portion 38 having a slot 40 receiving stub arm 30. Member 32 is rigidly secured to tailgate 14 as by screws 42.

Referring now to FIGURES 3–5, the crank leg 24 of torsion bar 20 is slidably received in a bore 42 extending diametrically through a generally cylindrical member 44. Member 44 is disk shaped and may be formed of a suitable plastics material. Member 44 is rotatably received in a housing indicated generally at 46.

Housing 46 includes a cup shaped portion 48 and a flange portion 50.

Cup shaped portion 48 has diametrically opposed circumferentially extending slots 52 and flange portion 50 has a series of mounting holes 54.

In assembled relation, cylindrical member 44 is rotatably journaled in cup shaped portion 48 with the free end of crank leg 24 passing through slots 52 and bore 42, and housing 46 is rigidly secured to the inner face of pillar 10 by screws 55 passing through mounting holes 54. Housing 46 thus mounts cylindrical member 44 for rotation about an axis substantially parallel to the pivotal axis of tailgate 14.

From the foregoing it will be apparent that as tailgate 14 is pivoted between its open and closed positions, crank leg 24 undergoes pivotal movement about a fixed axis parallel to the pivotal axis of tailgate 14 and simultaneous translatory movement along its lengthwise axis, the pivotal movement occurring as a rotation of cylindrical member 44 in housing 46 and the translatory movement occurring as a sliding of leg 24 in diametrical bore 42 of member 44. As best seen in FIGURE 3, slots 52 have a circumferential length sufficient to accommodate the aforesaid pivotal movement of crank leg 24.

As gate 14 moves between its open and closed positions, torsion leg 22 alternately twists and unwinds to selectively store and release energy. Preferably, the mounting and dimensions of the various elements are selected so that torsion leg 22 is relaxed when tailgate 14 occupies a substantially vertical position so that it stores energy upon movement of the gate in either direction away from this neutral position. Thus, when the latching mechanism (not shown) holding the tailgate in its closed position is released, torsion leg 22 unwinds to pop open the tailgate and when the tailgate is raised manually from its down position, torsion leg 22 unwinds to assist in the raising of the gate.

In order that crank leg 24 may also serve as a tension strut with the tailgate in its down or open position, a transverse stop surface is provided adjacent the free end of leg 24 for coaction with a complimentary stop surface on the vehicle. In the embodiment shown, the transverse stop surface on the crank leg is defined by the annular edge surface of a cap member 56 fitted over the free end of leg 24 and fixed thereon by a pin 58, and the transverse stop surface on the vehicle is provided by a built-up flat surface 60 on cup shaped portion 48 of housing 46. Surface 60 is built-up around the upper slot 52 adjacent one end of the latter.

As tailgate 14 approaches its open position, crank leg 24 rotates toward the end of slot 52 and slides downwardly in member 44 to move the stop surface defined by cap member 56 toward surface 60. As seen in FIGURES 2 and 3, the two stop surfaces move into abutting relation as tailgate 14 reaches its down position so that leg 24 serves as a tension strut supporting gate 14 in its open position.

Preferably, and in order to assist leg 24 in supporting gate 14, a support bar 62, seen in FIGURES 1 and 2, is provided at the opposite side of the tailgate from leg 24.

Bar 62 is of generally L shape and includes a stub leg 64 and a strut leg 66. Stub leg 64 is suitably journaled in endwall 31 of tailgate 14 on the axis of torsion leg 22 of torsion bar 20. Strut leg 66 is slidably and rotatably mounted on pillar 11 by a housing 46a journaling a cylindrical member 44a, housing 46a and cylindrical member 44a being substantially identical to previously described housing 46 and cylindrical member 44. A cap member 56a fixed to the free end of strut leg 66 coacts with a stop surface (not seen) on housing 46a. The stop surface on housing 46a is substantially identical to stop surface 60 on housing 46 and, in the manner described above with reference to cap member 56 and stop surface 60, enables strut leg 66 to function as a tension strut with gate 14 in its down position. The support of gate 14 is thus shared by strut leg 66 and crank leg 24.

The present invention thus provides a unitary, smooth acting mechanism which functions effectively to both counterbalance the pivotal movement of the tailgate and support it while in its open position.

While a preferred embodiment of the invention has been illustrated and described in detail, it is to be understood that various changes and modifications may be made in the disclosed embodiment without departing from the scope or spirit of the invention as defined in the appended claims. For example, although the invention has been described with reference to the tailgate of a suburban type automobile, it has application to any motor vehicle closure member hinged for pivotal movement about a generally horizontal axis.

I claim:

1. In a motor vehicle having a cargo opening, a gate hinged for pivotal movement about a horizontal axis between a substantially upright closed position closing at least a portion of said opening and a substantially horizontal open position extending from said motor vehicle to form an extension of the cargo floor of the latter, and means for counterbalancing said gate during movement between its said positions and supporting said gate while in its said open position; the improvement wherein said means comprises:
   (A) a torsion bar of generally L shape;
   (B) means mounting said bar on said gate with one leg thereof extending substantially parallel to the pivotal axis of said gate;
   (C) means holding the free end of said one leg against rotation relative to said gate;
   (D) a member having an arcuate bearing surface centered on another axis parallel to said gate axis;
   (E) fixed bearing means at one side of said opening defining an arcuate bearing surface centered on said other axis, said bearing means receiving said member with said arcuate bearing surface in slidable juxtaposition to mount said member for rotation about said other axis;
   (F) said member having a portion having a substantial thickness measured in a direction generally normal to said gate axis and having a bore extending through said portion to provide an elongated journal slidably receiving and supporting the other end of said torsion bar;
   (G) means defining a stop surface adjacent the free end of said other leg extending transverse to the lengthwise axis of the latter and facing toward said one leg; and
   (H) means on said vehicle at said one side of said opening defining a stop surface adapted to engage the stop surface on said other leg when said gate reaches its open position, whereby said other leg may serve as a rigid tension strut supporting said gate.

2. A motor vehicle according to claim 1 and further including:
   (A) another bar of generally L shape having
      (1) a stub leg journaled in said gate on the axis of said one leg of said torsion bar and
      (2) a strut leg;
   (B) a member slidably receiving said strut leg;
   (C) means mounting said member on a portion of said vehicle at the other side of said opening for rotation about said parallel axis;
   (D) means defining a stop surface adjacent the free end of said strut leg extending transversely of the lengthwise axis of the latter and facing toward said stub leg; and
   (E) means on said vehicle at said other side of said opening defining a stop surface adapted to engage the stop surface on said strut leg when said gate reaches its open position, whereby said other leg and said strut leg may coact to provide rigid tension struts supporting said gate.

3. In a motor vehicle having a cargo opening, a gate hinged for pivotal movement about a horizontal axis between a substantially upright closed position closing at least a portion of said opening and a substantially horizontal open position extending from said motor vehicle to form an extension of the cargo floor of the latter, and means for counterbalancing said gate during movement between its said positions and supporting said gate while in its said open position; the improvement wherein said means comprises:
   (A) a torsion bar of generally L shape;
   (B) means mounting said bar on said gate with one leg thereof extending substantially parallel to the pivotal axis of said gate;
   (C) means holding the free end of said one leg against rotation relative to said gate;
   (D) a member having an arcuate bearing surface centered on another axis parallel to said gate axis and having a bore extending therethrough slidably receiving the other leg of said torsion bar;
   (E) a housing rigidly secured to a portion of said vehicle at one side of said opening and defining an arcuate bearing surface centered on said other axis, said housing receiving said member with said arcuate bearing surfaces in slidable juxtaposition to mount said member for rotation about said other axis;
   (F) means defining a stop surface adjacent the free end of said other leg extending transverse to the lengthwise axis of the latter and facing toward said one leg;
   (G) means on said vehicle at said one side of said opening defining a stop surface adapted to engage the stop surface on said other leg when said gate reaches its open position, whereby said other leg may serve as a rigid tension strut supporting said gate.

4. In a motor vehicle having a cargo opening, a gate hinged for pivotal movement about a horizontal axis between a substantially upright closed position closing at least a portion of said opening and a substantially horizontal open position extending from said motor vehicle to form an extension of the cargo floor of the latter, and means for counterbalancing said gate during movement between its said positions and supporting said gate while in its said open position; the improvement wherein said means comprises:
   (A) a torsion bar of generally L shape;
   (B) means mounting said bar on said gate with one leg thereof extending substantially parallel to the pivotal axis of said gate;
   (C) means holding the free end of said one leg against rotation relative to said gate;
   (D) a cylindrical member having a bore extending substantially diametrically therethrough slidably receiving the other leg of said torsion bar;
   (E) a housing rigidly secured to a portion of said vehicle at one side of said opening and including a generally cup-shaped portion
      (1) rotatably receiving said cylindrical member and
      (2) cut away to pass said other leg and accommodate the pivotal movement of the latter as said gate is moved between its said position;
(F) means defining a stop surface adjacent the free end of said other leg extending transverse to the lengthwise axis of the latter and facing toward said one leg; and
(G) means on said cup-shaped housing portion defining a stop surface adapted to engage the stop surface on said other leg when said gate reaches its open position, whereby said other leg may serve as a rigid tension strut supporting said gate.

5. In a motor vehicle having a cargo opening, a gate hinged for pivotal movement about a horizontal axis between a substantially upright closed position closing at least a portion of said opening and a substantially horizontal open position extending from said motor vehicle to form an extension of the cargo floor of the latter, and means for counterbalancing said gate during movement between its said positions and supporting said gate while in its said opening position; the improvement wherein said means comprises:
(A) a torsion bar of generally L shape;
(B) means mounting said bar on said gate with one leg thereof extending substantially parallel to the pivotal axis of said gate;
(C) means holding the free end of said one leg against rotation relative to said gate;
(D) a cylindrical member having a bore extending substantially diametrically therethrough slidably receiving the other leg of said torsion bar;
(E) a housing rigidly secured to a portion of said vehicle at one side of said opening and including a generally cup-shaped portion
(1) rotatably receiving said cylindrical member and
(2) having diametrically opposed circumferentially extending slots to pass said other leg and accommodate the pivotal movement of the latter as said gate is moved between its said position;
(F) means defining a stop surface adjacent the free end of said other leg extending transverse to the lengthwise axis of the latter and facing toward said one leg; and
(G) means adjacent one of said slots defining a stop surface adapted to abut against the stop surface on said other leg when said gate reaches its open position, whereby said other leg may serve as a tension strut supporting said gate.

6. A motor vehicle according to claim 5 and further including:
(A) another bar of generally L shape and having
(1) a stub leg journaled in said gate on the axis of said one leg of said torsion bar and
(2) a strut leg;
(B) a cylindrical member having a bore extending substantially diametrically therethrough slidably receiving said strut leg;
(C) a housing rigidly secured to a portion of said vehicle at the other side of said opening and including a generally cup-shaped portion
(1) rotatably receiving said cylindrical member and
(2) having diametrically opposed circumferentially extending slots to pass said strut leg and accommodate the pivotal movement of the latter as said gate is moved between its said positions;
(D) means defining a stop surface adjacent the free end of said strut leg extending transverse to the lengthwise axis of the latter and facing toward said stub leg; and
(E) means adjacent one of said slots defining a stop surface adapted to abut against the stop surface on said strut leg when said gate reaches its open position, whereby said other leg and said strut leg may coact to provide rigid tension struts supporting said gate.

7. A motor vehicle according to claim 5 wherein said housing further includes a flange portion at the open end of said cup-shaped portion rigidly secured to said vehicle portion.

8. A motor vehicle according to claim 6 wherein said transverse stop surfaces on said other leg and on said strut leg are each defined by the annular edge surface of a cap member fitted over and rigidly secured to the free end of the respective leg.

References Cited

UNITED STATES PATENTS 576,972  2/1897  Tower _____ 312—315
2,984,517  5/1961  Farrow et al. _____ 296—57

BENJAMIN HERSH, *Primary Examiner.*

J. H. BRANNEN, *Assistant Examiner.*